US010730405B2

(12) United States Patent
Takeoka et al.

(10) Patent No.: US 10,730,405 B2
(45) Date of Patent: Aug. 4, 2020

(54) STATION BUILDING AUXILIARY POWER UNIT FOR EFFICIENT USE OF REGENERATIVE POWER

(71) Applicant: MITSUBISHI ELECTRIC CORPORATION, Chiyoda-ku, Tokyo (JP)

(72) Inventors: Toshiaki Takeoka, Tokyo (JP); Shinichi Matsumoto, Tokyo (JP); Shuji Ishikura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 6 days.

(21) Appl. No.: 15/752,769

(22) PCT Filed: Aug. 27, 2015

(86) PCT No.: PCT/JP2015/074225
§ 371 (c)(1),
(2) Date: Feb. 14, 2018

(87) PCT Pub. No.: WO2017/033328
PCT Pub. Date: Mar. 2, 2017

(65) Prior Publication Data
US 2018/0236899 A1    Aug. 23, 2018

(51) Int. Cl.
*B60M 3/06*    (2006.01)
*H02J 3/38*    (2006.01)
(Continued)

(52) U.S. Cl.
CPC .............. *B60M 3/06* (2013.01); *B60L 7/14* (2013.01); *B60M 3/02* (2013.01); *H02J 3/06* (2013.01);
(Continued)

(58) Field of Classification Search
CPC ......... B60L 2200/26; B60L 7/14; B60M 3/02; B60M 3/06; H02J 3/06; H02J 3/38
(Continued)

(56) References Cited

U.S. PATENT DOCUMENTS

2010/0308649 A1\* 12/2010 Kono ...................... B60L 9/005
                                                                        307/9.1
2016/0161935 A1   6/2016 Tominaga et al.
2017/0305300 A1\* 10/2017 Katsumata ............... B60M 3/06

FOREIGN PATENT DOCUMENTS

JP    59-137223 A    8/1984
JP    60-245408 A    12/1985
(Continued)

OTHER PUBLICATIONS

Extended European Search Report dated Dec. 10, 2018, issued by the European Patent Office in corresponding European Application No. 15902297.9. (9 pages).
(Continued)

*Primary Examiner* — Chun Cao
(74) *Attorney, Agent, or Firm* — Buchanan Ingersoll & Rooney PC

(57) ABSTRACT

A station building auxiliary power unit includes a start-of-operation determination unit that determines, based on a first signal that represents information on a power flow direction indicating a direction of flow of electrical power between an AC distribution line electrically connecting to an electric vehicle and a substation for supplying AC power to the AC distribution line, whether first AC power on an AC distribution line side is to be transformed into second AC power usable by a load, and if it is determined that transformation is to be performed, generates and outputs a second signal, a voltage instruction value calculator that calculates and outputs a voltage instruction value corresponding to the second signal, and a PWM signal generator that generates a control
(Continued)

signal for a power converter circuit operated upon transformation of the first AC power into the second AC power, and outputs the control signal.

17 Claims, 9 Drawing Sheets

(51) Int. Cl.
*H02J 3/06* (2006.01)
*B60L 7/14* (2006.01)
*B60M 3/02* (2006.01)

(52) U.S. Cl.
CPC ............ *H02J 3/38* (2013.01); *B60L 2200/26* (2013.01); *Y02B 70/3225* (2013.01); *Y04S 20/222* (2013.01)

(58) Field of Classification Search
USPC ............................................ 700/297; 363/13
See application file for complete search history.

(56) References Cited

FOREIGN PATENT DOCUMENTS

| | | |
|---|---|---|
| JP | 2-077340 A | 3/1990 |
| JP | 5-338481 A | 12/1993 |
| JP | 2006-062427 A | 3/2006 |
| JP | 2006-168390 A | 6/2006 |
| JP | 2007-236196 A | 9/2007 |
| JP | 2010-215048 A | 9/2010 |
| JP | 5125155 B2 | 1/2013 |
| JP | 5352731 B2 | 11/2013 |
| JP | 2014-129001 A | 7/2014 |
| WO | WO 2015/019466 A1 | 2/2015 |

OTHER PUBLICATIONS

International Search Report (PCT/ISA/210) dated Oct. 6, 2015, by the Japanese Patent Office as the International Searching Authority for International Application No. PCT/JP2015/074225.
Written Opinion (PCT/ISA/237) dated Oct. 6, 2015, by the Japanese Patent Office as the International Searching Authority for International Application No. PCT/JP2015/074225.
Office Action (Communication pursuant to Article 94(3) EPC) dated Sep. 25, 2019, by the European Patent Office in corresponding European Patent Application No. 15902297.9. (4 pages).
Office Action dated Jan. 9, 2020, by the India Patent Office in corresponding India Patent Application No. 201847006169 and English translation of the Office Action. (6 pages).
European Office Action dated May 11, 2020 issued in corresponding European Patent Application No. 15902297.9 (5 pages).

\* cited by examiner

STATION BUILDING AUXILIARY POWER UNIT FOR EFFICIENT USE OF REGENERATIVE POWER

FIELD

The present invention relates to a station building auxiliary power unit for supplying electrical power to electrical equipment in a station building.

BACKGROUND

In a recent railroad system, an electric railway vehicle (hereinafter referred to simply as electric vehicle) having a regenerative brake is popular. However, if there are only a small number of, or no, other electric vehicles operating as a load that consumes regenerative power fed back to an alternating current (AC) distribution line from the electric vehicles, excess regenerative power is returned to the electric power company via an electric power substation (hereinafter referred to simply as substation), thereby preventing effective utilization of the regenerative power. In addition, a direct current (DC) distribution line may result in regeneration cancellation, thereby possibly preventing use of a regenerative brake.

To address the problem described above, Patent Literature 1 discloses a system that charges an electrical power storage apparatus using regenerative power when there are no electric vehicles that consume the regenerative power. When the distribution line voltage, equal to the feeder voltage, reaches or exceeds a charge start voltage, this system converts the regenerative power into DC power to charge the electrical power storage apparatus, while when the distribution line voltage reaches or fall below the discharge start voltage, this system discharges electrical power stored in the electrical power storage apparatus to the distribution line. In this relation, if the charge start voltage is fixed, when the distribution line voltage increases and reaches the charge start voltage during no-load hours, such as in an early morning or late at night, the electrical power storage apparatus may be charged with electrical power supplied from a substation, rather than with regenerative power from an electric vehicle, thus causing cross current. To avoid occurrence of cross current, the system of Patent Literature 1 monitors the distribution line voltage for a certain time period to calculate an average voltage, and sets the charge start voltage to a voltage value that is several volts higher than the average voltage of the distribution line voltage.

In addition, to address the problem described above, Patent Literature 2 discloses a system that utilizes a phenomenon that an output voltage of a rectifier installed in a substation has a ripple component, which is a frequency component, while, in contrast, a regenerative voltage of an electric vehicle has no ripple components, to estimate the no-load voltage on the basis of a determination that a distribution line voltage without ripple components is identical to the ripple peak voltage, and thus periodically resets the regeneration start voltage on the basis of the estimated no-load voltage.

CITATION LIST

Patent Literature

Patent Literature 1: Japanese Patent Application Laid-open No. 2006-168390

Patent Literature 2: Japanese Patent Application Laid-open No. 2014-129001

SUMMARY

Technical Problem

However, even when regenerative power is being exchanged among electric vehicles, and thus the distribution line voltage is low, such as during rush hours, the technology of Patent Literature 1 may possibly cause the regenerative power being exchanged to be stored in an electrical power storage apparatus, or be consumed by a load installed in a station building. It is desirable that during a situation in which regenerative power is being exchanged among electric vehicles, the regenerative power be not stored in an electrical power storage apparatus, or be not consumed by a load installed in a station building. In addition, since the technology of Patent Literature 2 utilizes a ripple component generated by a rectifier installed in a substation, such technology is not applicable to an AC distribution line system.

The present invention has been made in view of the foregoing, and an object of the present invention is therefore to provide a station building auxiliary power unit capable of efficiently utilizing regenerative power in an AC distribution line system.

Solution to Problem

To solve the problem and to achieve the object described above, a station building auxiliary power unit of the present invention includes a start-of-operation determination unit that determines, on the basis of a first signal that represents information on a power flow direction indicating a direction of flow of electrical power between an AC distribution line electrically connecting to an electric vehicle and a substation for supplying AC power to the AC distribution line, whether first AC power on an AC distribution line side is to be transformed into second AC power usable by a load, and in a case in which it is determined that transformation is to be performed, generates and outputs a second signal. The station building auxiliary power unit also includes a voltage instruction value calculator that calculates and outputs a voltage instruction value dependent on the second signal. The station building auxiliary power unit further includes a control signal generator that generates, on the basis of the voltage instruction value, a control signal for a power converter circuit to transform the first AC power into the second AC power, and outputs the control signal.

Advantageous Effects of Invention

The present invention provides an advantage in that regenerative power can be efficiently used in an AC distribution line system.

DESCRIPTION OF EMBODIMENTS

A station building auxiliary power unit according to each of the embodiments of the present invention will be described in detail with reference to the drawings. However, the present invention is not limited to these embodiments.

First Embodiment

Figure 1:
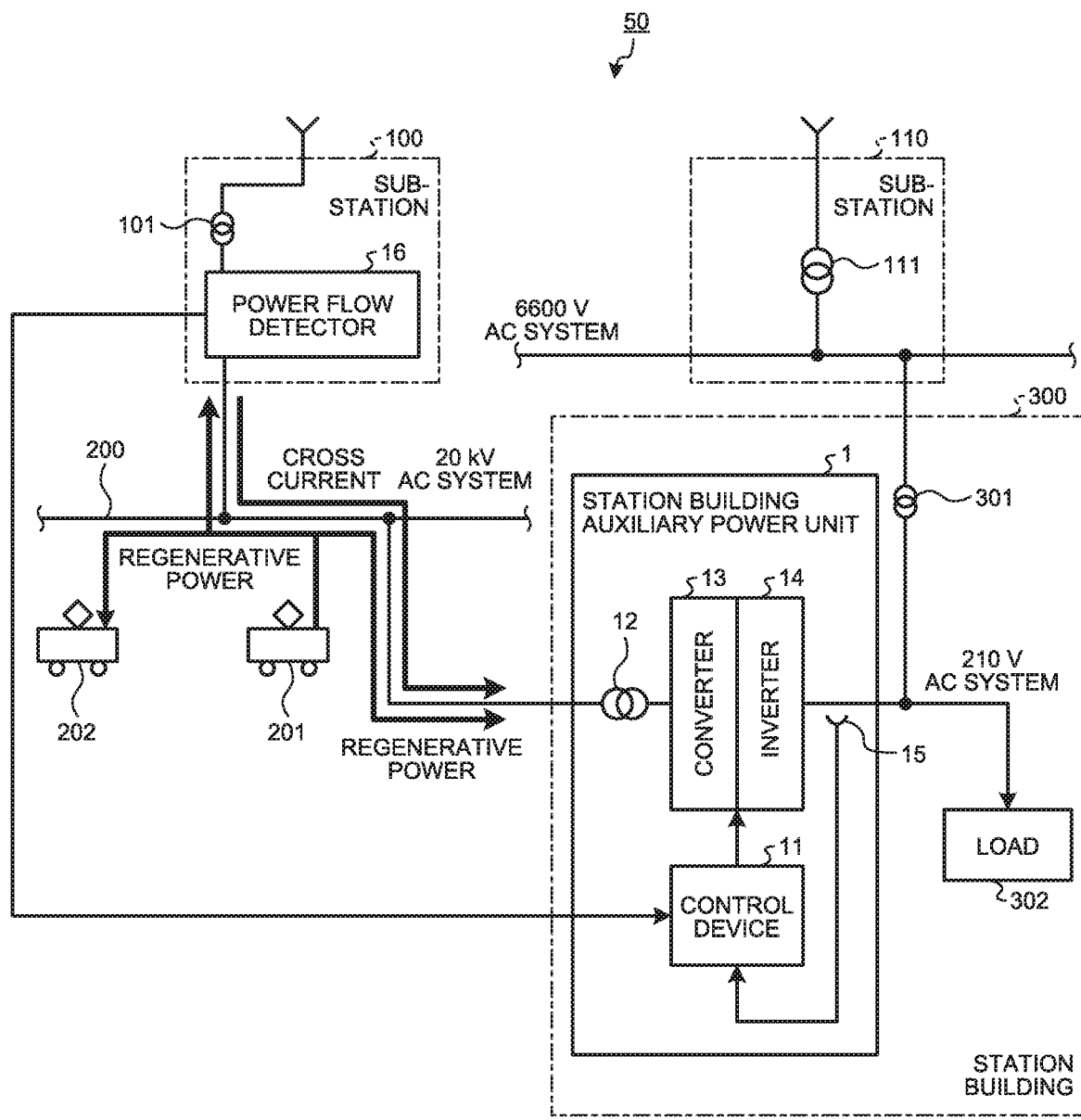
FIG. 1 is a diagram illustrating an example configuration of a railroad system including a station building auxiliary power unit according to a first embodiment.

FIG. 1 is a diagram illustrating an example configuration of a railroad system 50 including a station building auxiliary power unit 1 according to a first embodiment of the present invention. The railroad system 50 includes electric vehicles 201 and 202, an AC distribution line 200 that supplies AC power to the electric vehicles 201 and 202, a substation 100 that supplies AC power to the AC distribution line 200, a station building 300 including the station building auxiliary power unit 1, and a substation 110 that supplies AC power to the station building 300. The railroad system 50 is a railroad system having an AC distribution line system.

The electric vehicle 201 is an electric vehicle having a regenerative brake. The electric vehicle 201 travels by using, for example, 20 kV AC (Alternating Current) power supplied from the substation 100 through the AC distribution line 200. In addition, if regenerative power is generated using the regenerative brake, the electric vehicle 201 outputs the generated regenerative power to the AC distribution line 200. The electric vehicle 202 is configured similarly to the electric vehicle 201.

The AC distribution line 200 is connected to the substation 100, and thus supplies the 20 kV AC power supplied from the substation 100 to the electric vehicles 201 and 202 and the like. In addition, the AC distribution line 200 supplies the regenerative power generated by the electric vehicles 201 and 202 to other electric vehicles, the station building 300, the substation 100, and the like. FIG. 1 illustrates an example in which the AC distribution line 200 supplies the regenerative power generated by the electric vehicle 201 to the electric vehicle 202, to the station building 300, and to the substation 100. Note that the AC distribution line 200 can also supply the regenerative power generated by the electric vehicle 202 to the electric vehicle 201, to the station building 300, and to the substation 100. FIG. 1 illustrates the AC power on the AC distribution line 200 as 20 kV AC, but this is merely an example, and this AC power may also be other AC power such as 25 kV AC.

The substation 100 includes a transformer 101 and a power flow detector 16. The transformer 101 transforms the voltage of the AC power supplied from a power generation plant or from a superior substation into, in the example of FIG. 1, 20 kV AC, and supplies the 20 kV AC power, obtained by the transformation, to the AC distribution line 200. Note that if the regenerative power generated by the electric vehicles 201 and 202 is output to the AC distribution line 200, AC power by the regenerative power may flow into the substation 100 from the AC distribution line 200.

The power flow detector 16 detects a power flow direction of power in the substation 100, that is, the direction in which the AC power is flowing between the AC distribution line 200 and the substation 100. The power flow direction represents the direction in which the AC power is flowing between the AC distribution line 200 and the substation 100. As used herein, the flow direction of the AC power when the AC power obtained by the transformation of the transformer 101 is supplied to the AC distribution line 200 is designated as forward direction, while the flow direction of the AC power when the regenerative power is flowing from the AC distribution line 200 to the substation 100 is designated as backward direction. The power flow detector 16 outputs information on the power flow direction of the detected power, to the station building auxiliary power unit 1 included in the station building 300. For example, in a case where the power flow detector 16 is an electric power meter, the power flow detector 16 outputs a measured power value to the station building auxiliary power unit 1 as a positive value when the AC power is flowing in the forward direction, in which AC power is supplied from the substation 100 to the AC distribution line 200, and outputs a measured power value to the station building auxiliary power unit 1 as a negative value when the AC power is flowing in the backward direction, in which regenerative power is transmitted from the AC distribution line 200 to the substation 100.

Although the power flow detector 16 has been described as being configured using an electric power meter, this configuration is merely an example, and is not limited thereto. For example, the power flow detector 16 may be constituted by a voltage sensor and a current sensor, and may thus output information on a voltage value measured by the voltage sensor and on a current value measured by the current sensor to the station building auxiliary power unit 1. In this case, the station building auxiliary power unit 1 can obtain information on the power value by computation, in an interface unit 20 or in a start-of-operation determination unit 21 of a control device 11 described below, using the voltage value measured by the voltage sensor and the current value measured by the current sensor. The description below assumes that the power flow detector 16 is an electric power meter. It is understood that although FIG. 1 illustrates the power flow detector 16 as being installed in the substation 100, this configuration is merely an example, and the power flow detector 16 may be provided outside the substation 100 as far as it is provided between the transformer 101 of the substation 100 and the AC distribution line 200.

The substation 110 includes a transformer 111. The transformer 111 transforms the voltage of the AC power supplied from a power generation plant or from a superior substation into, in the example of FIG. 1, 6600 V AC, and supplies the 6600 V AC power obtained by the transformation to the station building 300.

The station building 300 includes a transformer 301, a load 302, and the station building auxiliary power unit 1. The transformer 301 transforms the 6600 V AC power generated by the substation 110 into, for example, 210 V AC power. The transformer 301 supplies the 210 V AC power obtained by the transformation to the load 302. The load 302 is electrical equipment installed in the station building 300, such as a lighting system, an air conditioner, a display apparatus, an elevator, and an escalator. As will be described later, the load 302 can receive 210 V AC power supplied from the station building auxiliary power unit 1, but under a normal condition, the load 302 uses the 210 V AC power supplied from the transformer 301.

The station building auxiliary power unit 1 is configured to be capable of transforming the 20 kV AC power supplied from the AC distribution line 200 to generate 210 V AC power usable by the load 302 of the station building 300. However, the station building auxiliary power unit 1 does not constantly perform an AC power transformation operation, but determines whether the regenerative power generated by the electric vehicles in the railroad system 50 can be completely consumed by the electric vehicles, and performs a transformation operation in a case the regenerative power cannot be completely consumed. In other words, the station building auxiliary power unit 1 performs a transformation operation if the amount of the electric power, generated by the electric vehicles which are decelerating using the regenerative brake, is greater than the amount of the electric power consumed by other power-running electric vehicles. In the railroad system 50, it is possible to avoid the cross current illustrated in FIG. 1, namely, consumption of the 20 kV AC power supplied from the substation 100 in the station building 300.

The station building auxiliary power unit 1 includes a control device 11, a transformer 12, a converter 13, an inverter 14, and a voltage detector 15.

The control device 11 receives the regenerative power generated by the electric vehicles in operation, namely the electric vehicles 201 and 202 in the example of FIG. 1, through the AC distribution line 200, and determines whether the regenerative power needs to be transformed into power for supplying to the load 302, on the basis of information on the power flow direction received from the power flow detector 16 in the substation 100. If it is determined that transformation is needed, the control device 11 causes the transformer 12 to transform the voltage of the 20 kV AC power supplied from the AC distribution line 200, and controls operations of the converter 13 and of the inverter 14 using the information on the voltage value of the AC power on the load 302 side detected by the voltage detector 15, to perform the AC power transformation operation.

The transformer 12 transforms the voltage of the 20 kV AC power supplied from the AC distribution line 200 into AC power to a voltage that can be processed by the converter 13.

The converter 13 and the inverter 14 include switching elements and transform the 20 kV AC power on the AC distribution line 200 side to the 210 V AC power as a supply power to the load 302 by opening and closing each of the switching elements according to a pulse width modulation (PWM) signal that is a control signal input from the control device 11. The converter 13 may be configured using a diode instead of using a switching element. The converter 13 and the inverter 14 may collectively be referred to as power converter circuit.

The voltage detector 15 detects a voltage value of an output voltage from the inverter 14, the voltage value being the voltage value of the AC power on the load 302 side.

In FIG. 1, although the power flow detector 16 is disposed in the substation 100, the information on the power flow direction of the electric power, output from the power flow detector 16, is information needed by the station building auxiliary power unit 1, not by the substation 100. Accordingly, although the power flow detector 16 is disposed in the substation 100, the power flow detector 16 may be interpreted as being included in the station building auxiliary power unit 1 despite the distant installation location thereof.

Figure 2:
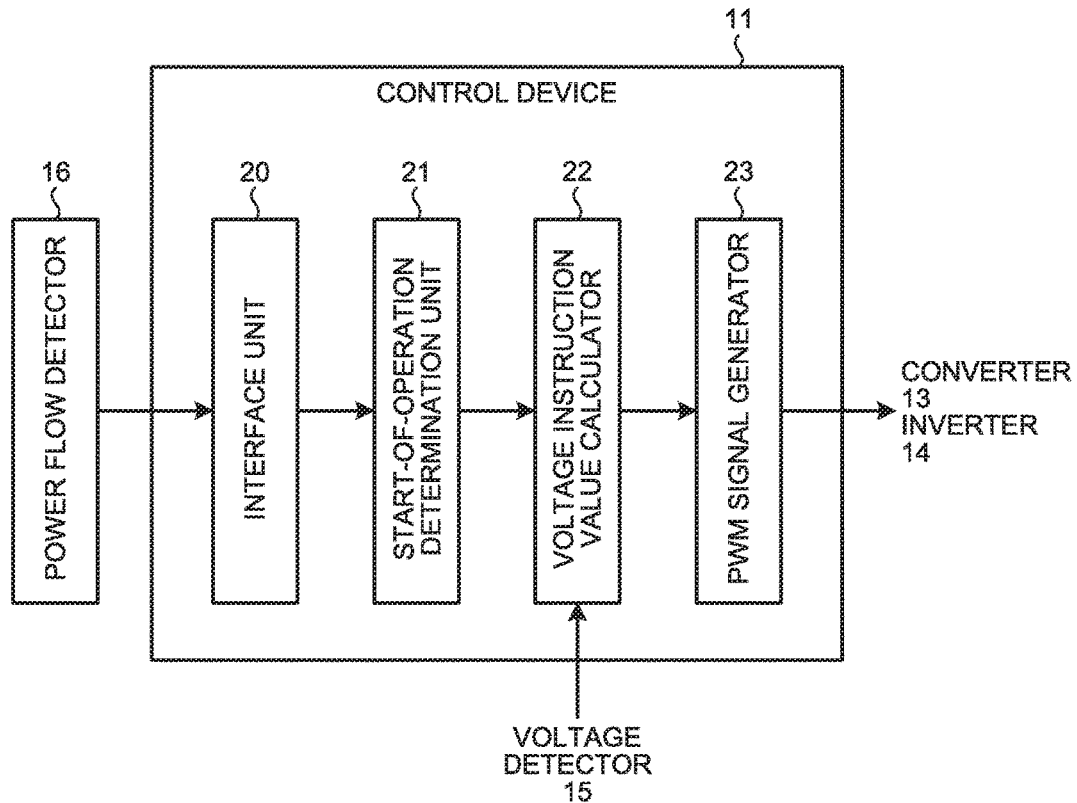
FIG. 2 is a diagram illustrating an example configuration of a control device according to the first embodiment.
Figure 3:
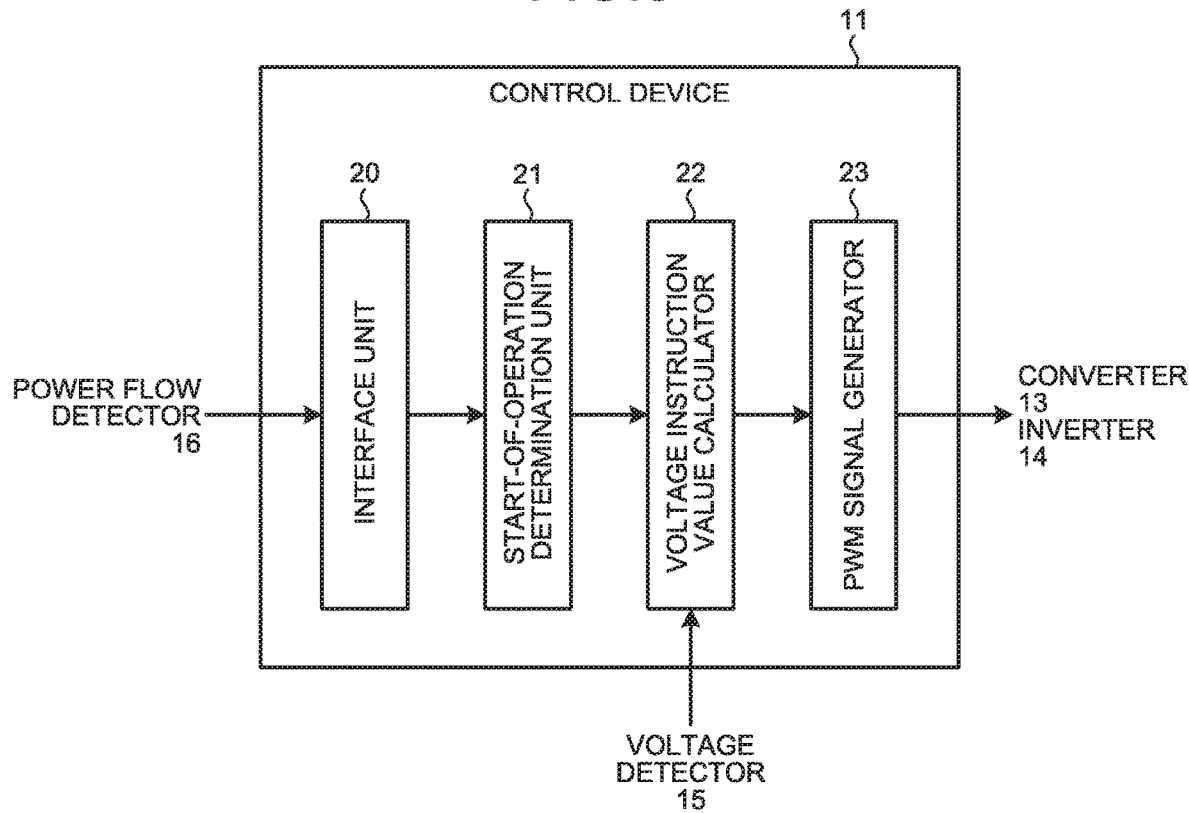
FIG. 3 is a diagram illustrating an example configuration of a control device according to the first embodiment.

The detailed configuration of the control device 11 will next be described. FIGS. 2 and 3 are diagrams each illustrating an example configuration of the control device 11 according to the first embodiment. FIG. 2 illustrates a configuration of the station building auxiliary power unit 1 including the power flow detector 16 in the first embodiment, while FIG. 3 illustrates a configuration of the station building auxiliary power unit 1 without the power flow detector 16 in the first embodiment. The control device 11 includes an interface unit 20, a start-of-operation determination unit 21, a voltage instruction value calculator 22, and a PWM signal generator 23.

The interface unit 20 is a signal converter that converts the information on the power flow direction of the power, input from the power flow detector 16, into a first signal that can be processed by the start-of-operation determination unit 21 provided downstream thereof. For example, if the power flow detector 16 is an electric power meter, the interface unit 20 performs analog-to-digital (AD) conversion on the power value, which is information representing the power flow direction of the power, input from the power flow detector 16. The interface unit 20 converts the power value in a form of an analog signal input from the power flow detector 16 into a first signal, which is a power value signal, in a form of a digital signal that can be processed by the start-of-operation determination unit 21 provided downstream thereof.

Specifically, the interface unit 20 performs AD conversion on the power flow direction information input from the power flow detector 16, in a case the power flow detector 16 is an electric power meter, on the power value measured by the electric power meter to obtain a digital signal representing a voltage ranging from −10V to +10V which can be processed by the start-of-operation determination unit 21 provided downstream thereof. Alternatively, if the power flow detector 16 is an electric power meter, the interface unit 20 performs AD conversion on the power value measured by the electric power meter to obtain a digital signal constituted by "0" and "1" that can be processed by the start-of-operation determination unit 21 provided downstream thereof.

The start-of-operation determination unit 21 determines whether the 20 kV AC power of the AC distribution line 200, the 20 kV AC power being also referred to as first AC power is to be transformed into the 210 V AC power usable by the load 302, the 210 V AC power being also referred to as second AC power, on the basis of the first signal, the first signal being the digital signal obtained by the conversion in the interface unit 20 and representing the power flow direction information.

For example, if the power flow detector 16 is an electric power meter, and the first signal input represents a negative value, which indicates a backward direction, the start-of-operation determination unit 21 determines that the AC power is flowing in a direction from the AC distribution line 200 to the substation 100, that is, in a backward direction. In this case, the start-of-operation determination unit 21 determines that the regenerative power generated by the electric vehicle is not completely consumed by the other electric vehicle, and thus flows into the substation 100, and accordingly, determines that the AC power on the AC distribution line 200 side is to be transformed into the AC power on the load 302 side to allow the regenerative power on the AC distribution line 200 generated by the electric vehicle to be consumed in the load 302 of the station building 300.

Otherwise, for example, if the power flow detector 16 is an electric power meter, and the first signal input represents a positive value, which indicates a forward direction, the start-of-operation determination unit 21 determines that the AC power is flowing in a direction from the substation 100 to the AC distribution line 200, that is, in a forward direction. In this case, the start-of-operation determination unit 21 determines that the regenerative power generated by the electric vehicle 201 is completely consumed by the electric vehicle 202, and accordingly, determines that the AC power on the AC distribution line 200 side is not to be transformed into the AC power on the load 302 side.

Upon determination that the AC power on the AC distribution line 200 side is to be transformed into the AC power on the load 302 side, the start-of-operation determination unit 21 generates, for example, a signal having a value "1" as a second signal indicating that the AC power on the AC distribution line 200 side is to be transformed into the AC power on the load 302 side, and outputs the second signal to the voltage instruction value calculator 22 provided downstream thereof. Otherwise, upon determination that the AC power on the AC distribution line 200 side is not to be transformed into the AC power on the load 302 side, the start-of-operation determination unit 21 generates, for example, a signal having a value "0," and outputs the generated signal to the voltage instruction value calculator 22 provided downstream thereof. It should be understood that signals having values "1" and "0" are provided merely by way of example, and a signal pattern other than "1" and "0" may also be used as far as the result of the determination by the start-of-operation determination unit 21 can be distinguished by the voltage instruction value calculator 22 provided downstream thereof.

Alternatively, the start-of-operation determination unit 21 may be configured such that, upon determination that the AC power on the AC distribution line 200 side is to be transformed into the AC power on the load 302 side, the start-of-operation determination unit 21 generates a second signal indicating that the AC power on the AC distribution line 200 side is to be transformed into the AC power on the load 302 side, and outputs the second signal to the voltage instruction value calculator 22 provided downstream thereof, while upon determination that the AC power on the AC distribution line 200 side is not to be transformed into the AC power on the load 302 side, the start-of-operation determination unit 21 does not have to output a second signal to the voltage instruction value calculator 22 provided downstream thereof.

Upon reception of a second signal from the start-of-operation determination unit 21, the voltage instruction value calculator 22 adds a preset voltage value that corresponds to a voltage drop value due to consumption of power in the station building auxiliary power unit 1 to the voltage value of the 210 V AC power on the load 302 side detected by the voltage detector 15 to calculate a voltage instruction value, which is a voltage value to be set on the PWM signal generator 23. The voltage instruction value calculator 22 outputs the voltage instruction value calculated to the PWM signal generator 23.

The PWM signal generator 23 is a control signal generator that generates a PWM signal functioning as a control signal for controlling the operation of the converter 13, and a PWM signal functioning as a control signal for controlling the operation of the inverter 14, on the basis of the voltage instruction value input from the voltage instruction value calculator 22. For example, if the converter 13 has a two-phase configuration having upper and lower arm switching elements, the PWM signal generator 23 generates four PWM signals, which are CGU, CGV, CGX, and CGY, for controlling the operation of four switching elements for the two phases. In addition, for example, if the inverter 14 has a three-phase configuration having upper and lower arm switching elements, the PWM signal generator 23 generates six PWM signals, which are IGU, IGV, IGW, IGX, IGY, and IGZ, for controlling the operation of six switching elements for the three phases. The PWM signal generator 23 outputs the four generated PWM signals CGU, CGV, CGX, and CGY for the converter 13 to the converter 13, and outputs the six generated PWM signals IGU, IGV, IGW, IGX, IGY, and IGZ for the inverter 14 to the inverter 14. If the converter 13 does not use switching elements, but includes diodes as described above, the PWM signal generator 23 generates and outputs only the PWM signals for the inverter 14, and does not generate the PWM signals for the converter 13.

In the control device 11, if the second signal indicating that the 20 kV AC power on the AC distribution line 200 side is to be transformed into the 210 V AC power on the load 302 side is not received from the start-of-operation determination unit 21, the voltage instruction value calculator 22 calculates a voltage instruction value equal to the voltage detected by the voltage detector 15, and outputs this value to the PWM signal generator 23. Thus, the voltage instruction value calculator 22 calculates the voltage instruction value dependent on the second signal.

Figure 4:
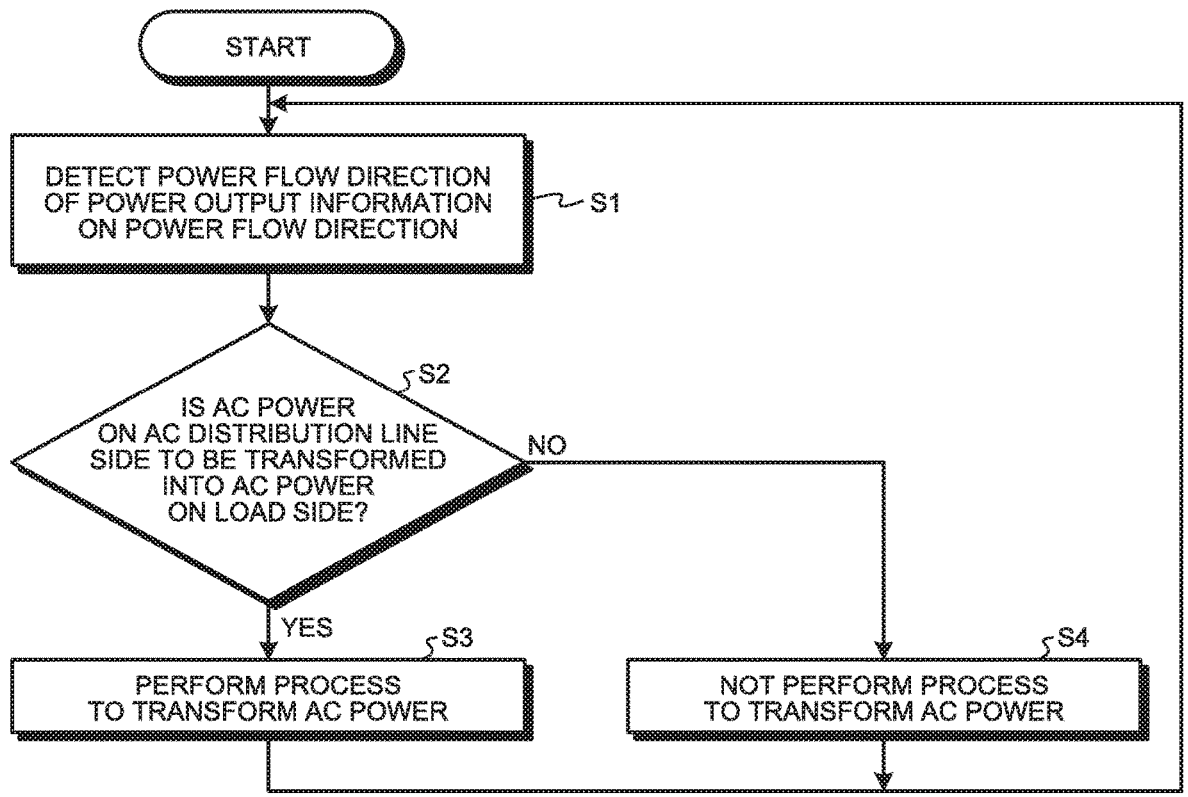
FIG. 4 is a flowchart illustrating an AC power transformation operation in the station building auxiliary power unit according to the first embodiment.

Next, the process performed in the station building auxiliary power unit 1 to transform the AC power on the AC distribution line 200 side into the AC power on the load 302 side will be described. FIG. 4 is a flowchart illustrating an AC power transformation operation in the station building auxiliary power unit 1 according to the first embodiment. The process performed by the station building auxiliary power unit 1 will be described when the regenerative power is generated by the electric vehicle 201 as illustrated in FIG. 1.

Figure 5:
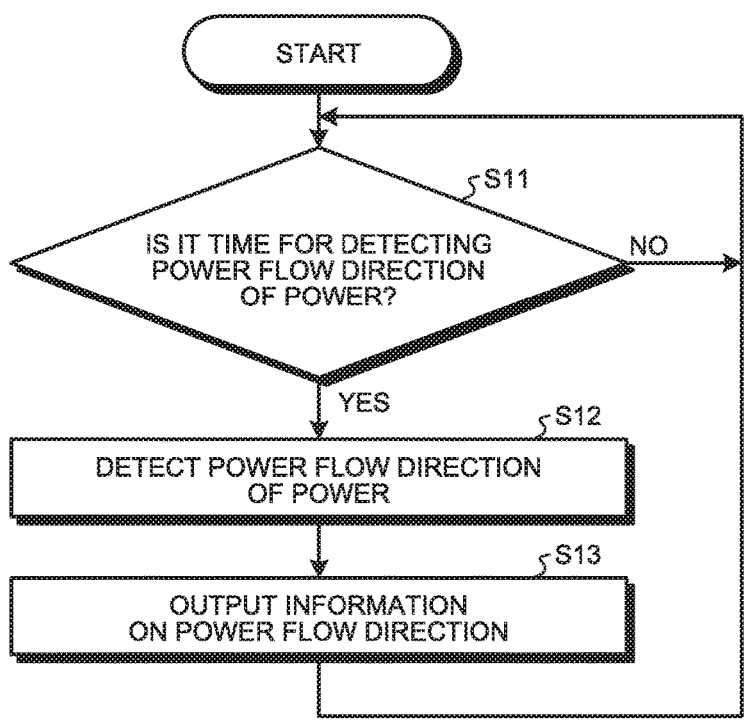
FIG. 5 is a flowchart illustrating an operation of a power flow detector according to the first embodiment.

First, the power flow detector 16 detects the power flow direction of the power between the substation 100 and the AC distribution line 200, and outputs information on the power flow direction to the control device 11 (step S1). A detailed operation of the power flow detector 16 at step S1 of FIG. 4 will now be described. FIG. 5 is a flowchart illustrating an operation of the power flow detector 16 according to the first embodiment. The power flow detector 16 detects periodically, for example every 20 ms, the power flow direction of the power between the substation 100 and the AC distribution line 200; and thus waits for the time for detecting the power flow direction of the power (step S11: No). When the timing for detecting the power flow direction of the power comes (step S11: Yes), the power flow detector 16 detects the power flow direction of the power (step S12). The power flow detector 16 outputs information on the power flow direction to the control device 11 (step S13). It should be understood that the detection by the power flow detector 16 of the power flow direction of the power between the substation 100 and the AC distribution line 200 every 20 ms is merely an example, and the detection interval is not limited to 20 ms.

Figure 6:
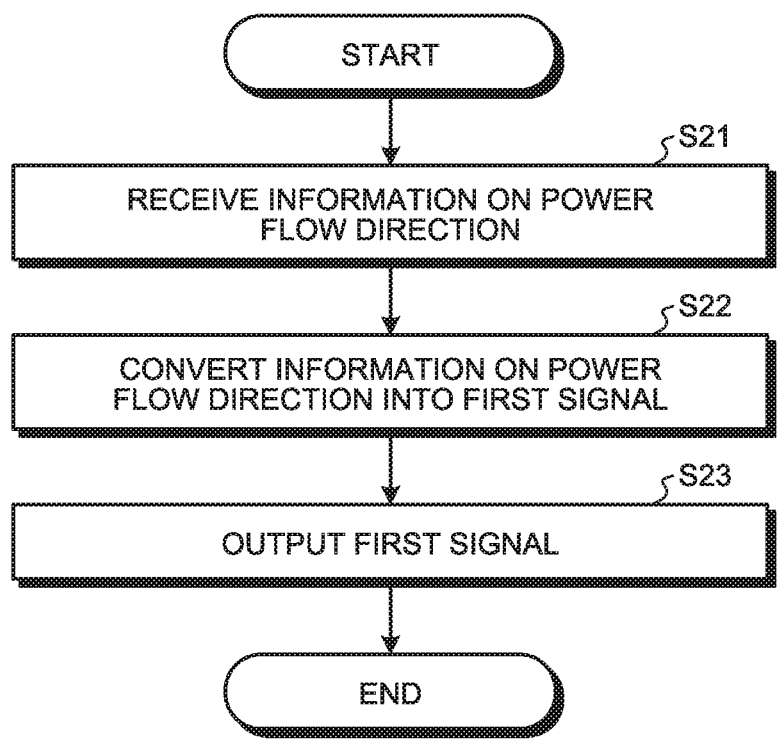
FIG. 6 is a flowchart illustrating an operation of an interface unit of the control device according to the first embodiment.

Returning to the flowchart of FIG. 4, upon reception of the information on the power flow direction from the power flow detector 16, the control device 11 determines whether the AC power on the AC distribution line 200 side is to be transformed into the AC power on the load 302 side (step S2). A detailed operation of the control device 11 at step S2 of FIG. 4 will now be described. FIG. 6 is a flowchart illustrating an operation of the interface unit 20 of the control device 11 according to the first embodiment. Upon reception of the information on the power flow direction from the power flow detector 16 (step S21), the interface unit 20 converts the information on the power flow direction into the first signal, which is a signal that can be processed by the start-of-operation determination unit 21 provided downstream thereof (step S22). The interface unit 20 outputs the first signal obtained by the conversion to the start-of-operation determination unit 21 (step S23).

Figure 7:
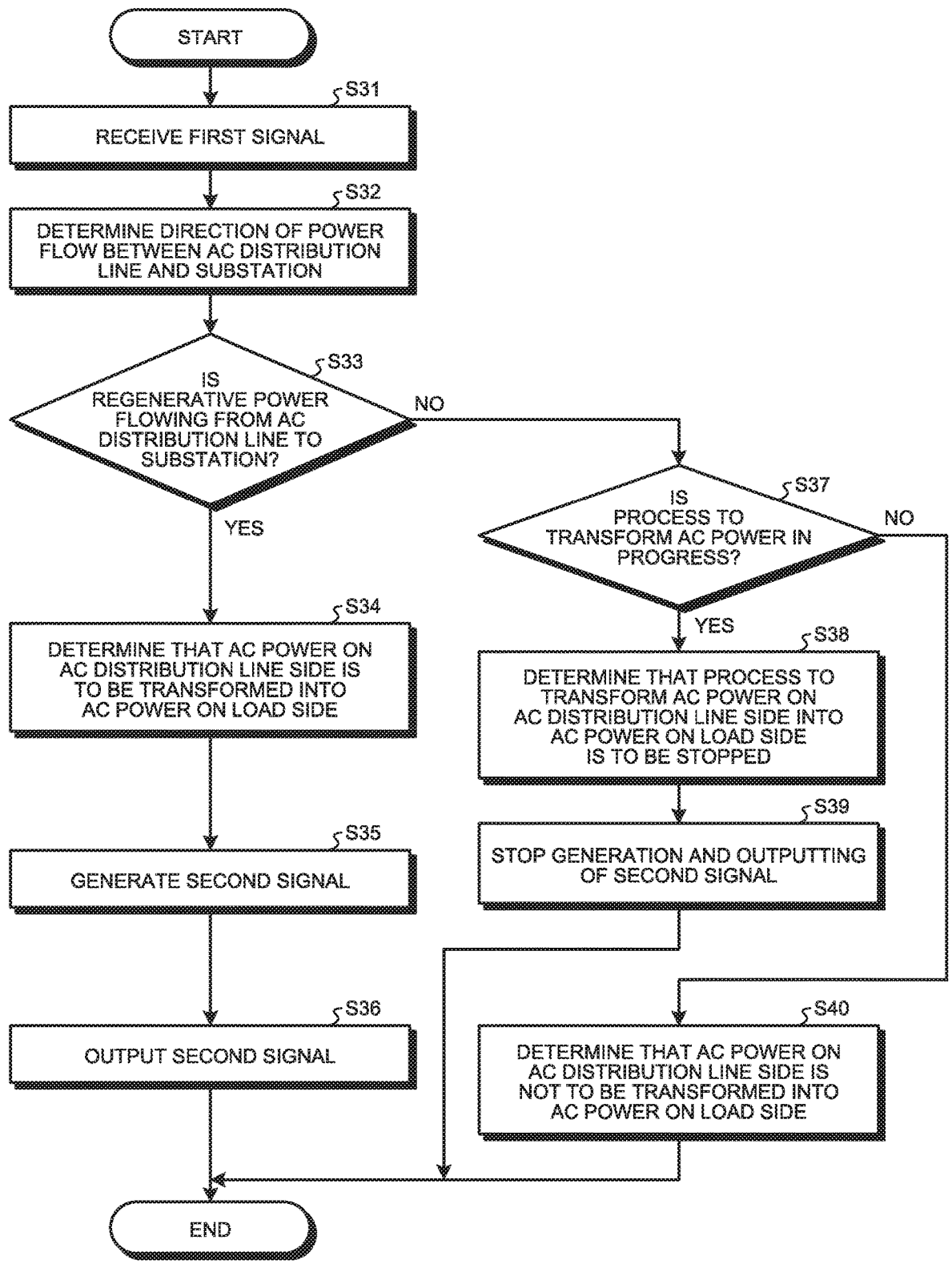
FIG. 7 is a flowchart illustrating an operation of a start-of-operation determination unit of the control device according to the first embodiment.

FIG. 7 is a flowchart illustrating an operation of the start-of-operation determination unit 21 of the control device 11 according to the first embodiment. Upon reception of the first signal, which is the digital signal obtained by AD conversion and representing the power flow direction information (step S31), from the interface unit 20, the start-of-operation determination unit 21 determines, on the basis of the first signal, the direction of the power flow between the AC distribution line 200 and the substation 100 (step S32). For example, if the power flow detector 16 is an electric power meter, and the first signal obtained by the conversion of the information on the power flow direction represents a positive value, which means that the power is flowing in a forward direction, namely, in the example of FIG. 1, the regenerative power generated by the electric vehicle 201 is completely consumed by the other electric vehicle 202, the start-of-operation determination unit 21 thus determines that AC power is supplied from the substation 100 to the AC distribution line 200 (step S33: No). Otherwise, for example, if the power flow detector 16 is an electric power meter, and the first signal obtained by the conversion of the information on the power flow direction represents a negative value, which means that the power is flowing in a backward direction, namely in the example of FIG. 1, the regenerative power generated by the electric vehicle 201 is not completely consumed by the other electric vehicle 202, the start-of-operation determination unit 21 thus determines that the regenerative power is flowing from the AC distribution line 200 to the substation 100 (step S33: Yes).

If it is determined that the regenerative power is flowing from the AC distribution line 200 to the substation 100 (step S33: Yes), the start-of-operation determination unit 21 determines that the AC power on the AC distribution line 200 side is to be transformed into the AC power on the load 302 side (step S34). The start-of-operation determination unit 21 generates a second signal indicating that the AC power is to be transformed (step S35), and outputs the generated second signal to the voltage instruction value calculator 22 (step S36).

If it is determined that AC power is supplied from the substation 100 to the AC distribution line 200 (step S33: No), the start-of-operation determination unit 21 then checks whether a process is in progress to transform the AC power on the AC distribution line 200 side into the AC power on the load 302 side (step S37). If a process is in progress to transform the AC power on the AC distribution line 200 side into the AC power on the load 302 side (step S37: Yes), the start-of-operation determination unit 21 determines that the process to transform the AC power on the AC distribution line 200 side into the AC power on the load 302 side is to be stopped (step S38). If a process is in progress to transform the AC power on the AC distribution line 200 side into the AC power on the load 302 side, the start-of-operation determination unit 21 stops generation and outputting of the second signal (step S39). If a process is not in progress to transform the AC power on the AC distribution line 200 side into the AC power on the load 302 side (step S37: No), the start-of-operation determination unit 21 determines that the AC power on the AC distribution line 200 side is not to be transformed into the AC power on the load 302 side (step S40). In this case, the start-of-operation determination unit 21 does not generate a second signal.

Returning to the flowchart of FIG. 4, if it is determined that the AC power on the AC distribution line 200 side is to be transformed into AC power on the load 302 side (step S2: Yes), the control device 11 performs a process to transform the AC power on the AC distribution line 200 side into the AC power on the load 302 side (step S3), and the process returns to step S1. Otherwise, if it is determined that the AC power on the AC distribution line 200 side is not to be transformed into the AC power on the load 302 side (step S2: No), the control device 11 does not perform a process to transform the AC power on the AC distribution line 200 side into the AC power on the load 302 side (step S4), and the process returns to step S1. Specifically, in the operation of the start-of-operation determination unit 21 illustrated in FIG. 7, the "Yes" branch at step S33 corresponds to the "Yes" branch at step S2 illustrated in FIG. 4, and the "No" branch at step S33 corresponds to the "No" branch at step S2 illustrated in FIG. 4.

Figure 8:
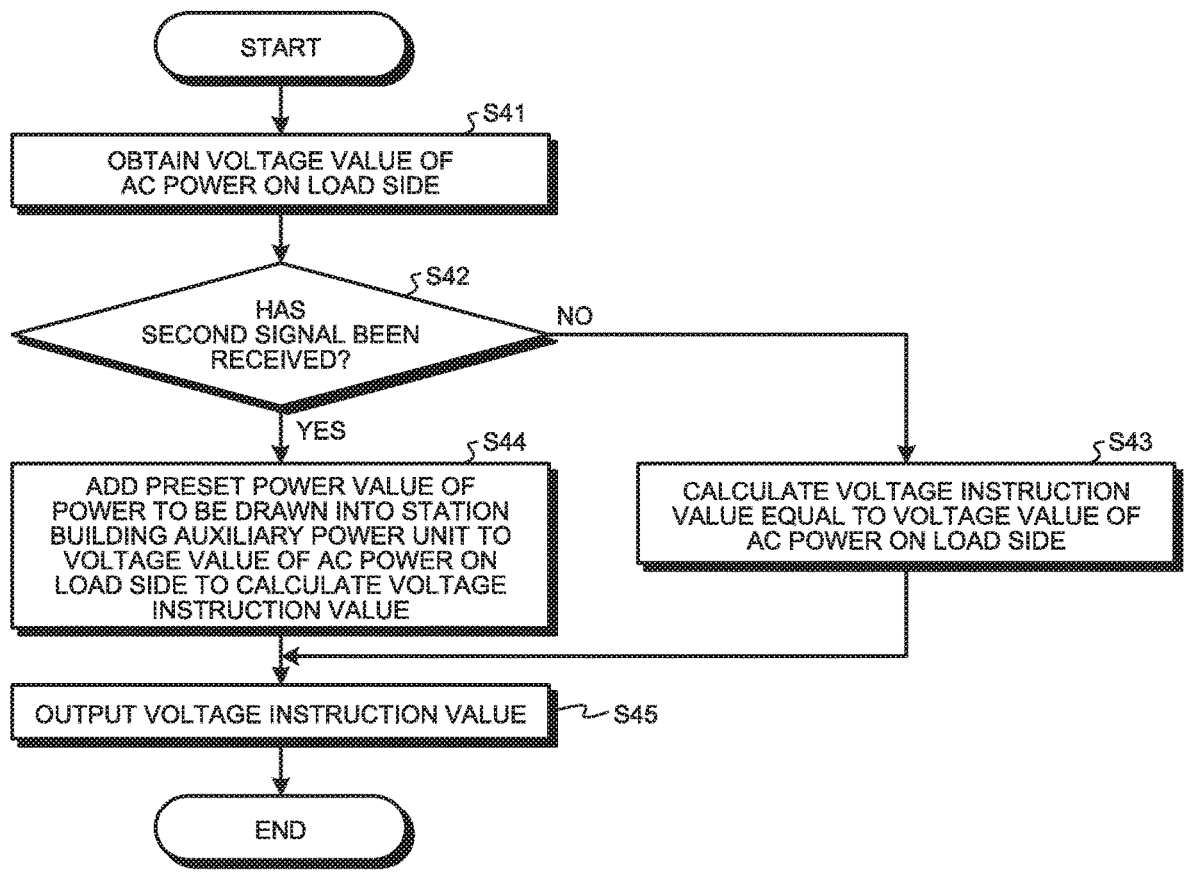
FIG. 8 is a flowchart illustrating an operation of a voltage instruction value calculator of the control device according to the first embodiment.

A detailed operation of the control device 11 at step S3 of FIG. 4 will now be described. FIG. 8 is a flowchart illustrating an operation of the voltage instruction value calculator 22 of the control device 11 according to the first embodiment. The voltage instruction value calculator 22 obtains, from the voltage detector 15, information on the voltage value of the AC power on the load 302 side (step S41). If the second signal is not received from the start-of-operation determination unit 21 (step S42: No), the voltage instruction value calculator 22 calculates a voltage instruction value equal to the voltage value of the AC power on the load 302 side, obtained from the voltage detector 15 (step S43). If the second signal is received from the start-of-operation determination unit 21 (step S42: Yes), the voltage instruction value calculator 22 adds a preset voltage value that corresponds to a voltage drop value due to consumption of power in the station building auxiliary power unit 1 to the voltage value of the AC power on the load 302 side obtained from the voltage detector 15 to calculate a voltage instruction value for the PWM signal generator 23 (step S44). After the calculation of the voltage instruction value at step S43 or step S44, the voltage instruction value calculator 22 outputs the voltage instruction value calculated to the PWM signal generator 23 (step S45).

Figure 9:
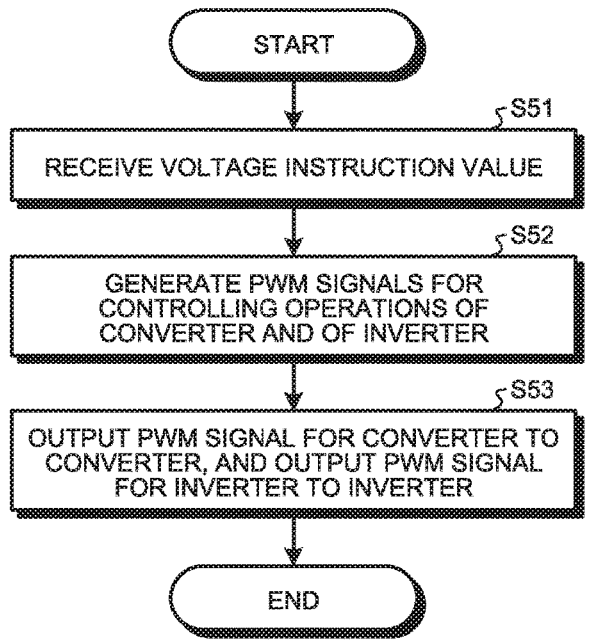
FIG. 9 is a flowchart illustrating an operation of a PWM signal generator of the control device according to the first embodiment.

FIG. 9 is a flowchart illustrating an operation of the PWM signal generator 23 of the control device 11 according to the first embodiment. Upon reception of the voltage instruction value from the voltage instruction value calculator 22 (step S51), the PWM signal generator 23 generates a PWM signal for controlling the operation of the converter 13, and a PWM signal for controlling the operation of the inverter 14, on the basis of the voltage instruction value (step S52). Then, the PWM signal generator 23 outputs the generated PWM signal for the converter 13 to the converter 13, and outputs the generated PWM signal for the inverter 14 to the inverter 14 (step S53).

On the basis of the operation described above, if AC power is flowing from the AC distribution line 200 to the substation 100, that is, if the regenerative power generated by the electric vehicle is flowing from the AC distribution line 200 to the substation 100, the station building auxiliary power unit 1 transforms the 20 kV AC power on the AC distribution line 200 side into the 210 V AC power on the load 302 side to allow the regenerative power generated by the electric vehicle to be consumed in the load 302 of the station building 300.

If AC power is flowing from the substation 100 to the AC distribution line 200, that is, if the regenerative power generated by the electric vehicles is not flowing from the AC distribution line 200 to the substation 100, the station building auxiliary power unit 1 does not perform a process to transform the 20 kV AC power on the AC distribution line 200 side into the 210 V AC power on the load 302 side.

Moreover, if the direction of the flow of the AC power between the AC distribution line 200 and the substation 100 changes to a direction from the substation 100 to the AC distribution line 200 during a process to transform the 20 kV AC power on the AC distribution line 200 side into the 210 V AC power on the load 302 side, the station building auxiliary power unit 1 stops the process to transform the 20 kV AC power on the AC distribution line 200 side into the 210 V AC power on the load 302 side.

A configuration of the station building auxiliary power unit 1 will next be described. In the station building auxiliary power unit 1, the transformer 12 is realized by a transformer circuit, the converter 13 is realized by an AC-to-DC converter circuit, the inverter 14 is realized by a DC-to-AC converter circuit, and the voltage detector 15 is realized by a voltmeter. If the power flow detector 16 is included in the station building auxiliary power unit 1, the power flow detector 16 is realized by, for example, an electric power meter. The description below will be given in terms of the configuration of the control device 11 included in the station building auxiliary power unit 1.

Figure 10:
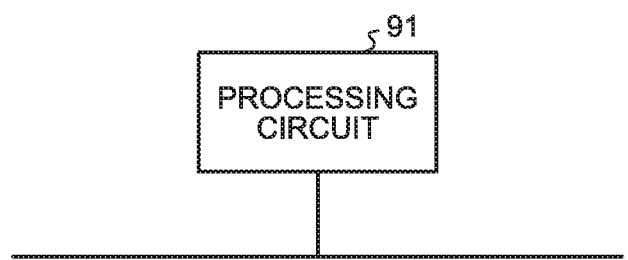
FIG. 10 is a diagram illustrating an example of hardware configuration of the control device of the station building auxiliary power unit according to the first embodiment.
Figure 11:
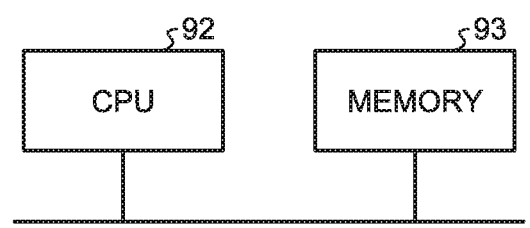
FIG. 11 is a diagram illustrating another example of hardware configuration of the control device of the station building auxiliary power unit according to the first embodiment.

FIGS. 10 and 11 are each a diagram illustrating an example of hardware configuration of the control device 11 of the station building auxiliary power unit 1 according to the first embodiment. The functions of the interface unit 20, the start-of-operation determination unit 21, the voltage instruction value calculator 22, and the PWM signal generator 23 of the control device 11 of the station building auxiliary power unit 1 are realized by a processing circuit 91. In other words, the control device 11 of the station building auxiliary power unit 1 includes a processing unit for: converting information on the power flow direction into a first signal; determining whether the AC power on the AC distribution line 200 side is to be transformed into the AC power on the load 302 side; calculating a voltage instruction value; and generating PWM signals for respectively controlling the operations of the converter 13 and of the inverter 14. The processing circuit 91 may be dedicated hardware, or may be a combination of a central processing unit (CPU) 92 and a memory 93, where the CPU 92 executes a program stored in the memory 93. The CPU 92 may be a central processing unit, a processing unit, a computing unit, a microprocessor, a microcomputer, a processor, a digital signal processor (DSP), and the like.

If the processing circuit 91 is dedicated hardware, examples of the processing circuit 91 include a single circuit, a composite circuit, a programmed processor, a parallel-programmed processor, an ASIC (application specific integrated circuit), an FPGA (field programmable gate array), and combinations thereof. The functions of the interface unit 20, the start-of-operation determination unit 21, the voltage instruction value calculator 22, and the PWM signal generator 23 may each be individually implemented in the processing circuit 91, or may collectively be implemented in the processing circuit 91.

If the processing circuit 91 is a combination of the CPU 92 and the memory 93, the functions of the interface unit 20, the start-of-operation determination unit 21, the voltage instruction value calculator 22, and the PWM signal generator 23 are implemented in software, firmware, or a combination of software and firmware. The software or firmware is described in the form of a program, and is stored in the memory 93. The processing circuit 91 provides the functions of these components by causing the CPU 92 to read and execute the program stored in the memory 93. That is, the control device 11 of the station building auxiliary power unit 1 includes a memory 93 for storing programs that, upon execution by the processing circuit 91, cause the processing circuit 91 to perform: a step of converting information on the power flow direction to a first signal, a step of determining whether the AC power on the AC distribution line 200 side is to be transformed into the AC power on the load 302 side, a step of calculating a voltage instruction value, and a step of generating PWM signals for respectively controlling the operations of the converter 13 and of the inverter 14, as a result. These programs can be said to cause a computer to perform the procedures and methods of the interface unit 20, the start-of-operation determination unit 21, the voltage instruction value calculator 22, and the PWM signal generator 23. In this relation, examples of the memory 93 include non-volatile and volatile semiconductor memories such as a random access memory (RAM), a read-only memory (ROM), a flash memory, an erasable programmable ROM (EPROM), and an electrically EPROM (EEPROM), a magnetic disk, a flexible disk, an optical disk, a compact disc, a mini disk, and a digital versatile disc (DVD).

The functions of the interface unit 20, the start-of-operation determination unit 21, the voltage instruction value calculator 22, and the PWM signal generator 23 may be partially implemented by dedicated hardware, and partially implemented by software or firmware. For example, it is possible that the functions of the interface unit 20 and the start-of-operation determination unit 21 be implemented by a processing circuit 91 configured as dedicated hardware, and the functions of the voltage instruction value calculator 22 and the PWM signal generator 23 be implemented by a processing circuit 91 such that the CPU 92 reads and executes programs stored in the memory 93.

As described above, the processing circuit 91 can realize the functions described above in hardware, software, firmware, or a combination thereof. Note that the configuration of the interface unit 20 is not limited to the configuration described above, and may be realized by an AD conversion circuit.

As has been described above, in the railroad system 50 having an AC distribution line system according to the first embodiment, the station building auxiliary power unit 1 determines, on the basis of information on the power flow direction of the AC power between AC distribution line 200 and the substation 100. If the AC power is flowing from the AC distribution line 200 to the substation 100, the station building auxiliary power unit 1 determines that the regenerative power generated in the electric vehicle is not completely consumed by the other electric vehicle, and is thus flowing into the substation 100, and accordingly, transforms the AC power on the AC distribution line 200 side into the AC power on the load 302 side. Otherwise, if the AC power is flowing from the substation 100 to the AC distribution line 200, the station building auxiliary power unit 1 does not transform the AC power on the AC distribution line 200 side into the AC power on the load 302 side. This configuration allows the station building auxiliary power unit 1 not to perform transformation of the AC power if the regenerative power generated by the electric vehicle is being used by the other electric vehicle, and to perform transformation of the AC power if the regenerative power generated by the electric vehicle is not completely consumed by the other electric vehicle. Thus, the regenerative power generated by the electric vehicle can be efficiently utilized in the load 302 of the station building 300.

Second Embodiment

In the first embodiment, the control device 11 obtains information on the power flow direction from the power flow detector 16, determines whether the AC power on the AC distribution line 200 side is to be transformed into the AC power on the load 302 side, and, if it is determined that transformation is to be performed, performs a process to transform the AC power. In a second embodiment, a description will be provided below for a case in which the process is performed outside the station building up to the step of determining whether the AC power on the AC distribution line 200 side is to be transformed into the AC power on the load 302 side. The portions different from those of the first embodiment will be described below.

Figure 12:
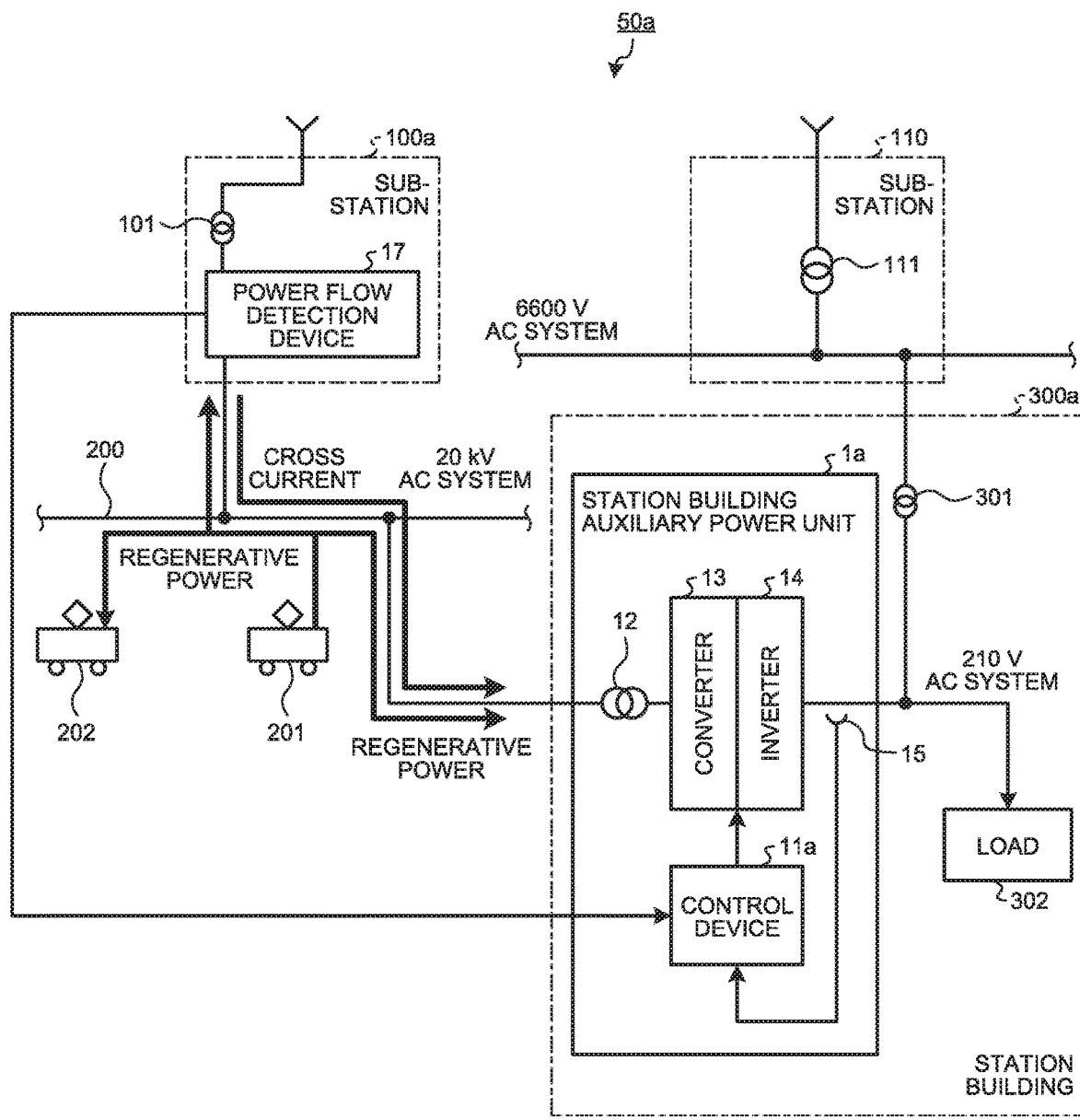
FIG. 12 is a diagram illustrating an example configuration of a railroad system including a station building auxiliary power unit according to a second embodiment.

FIG. 12 is a diagram illustrating an example configuration of a railroad system 50a including a station building auxiliary power unit 1a according to the second embodiment of the present invention. The railroad system 50a includes a station building 300a and a substation 100a in place of the station building 300 and the substation 100 of the railroad system 50 of the first embodiment illustrated in FIG. 1.

Figure 13:
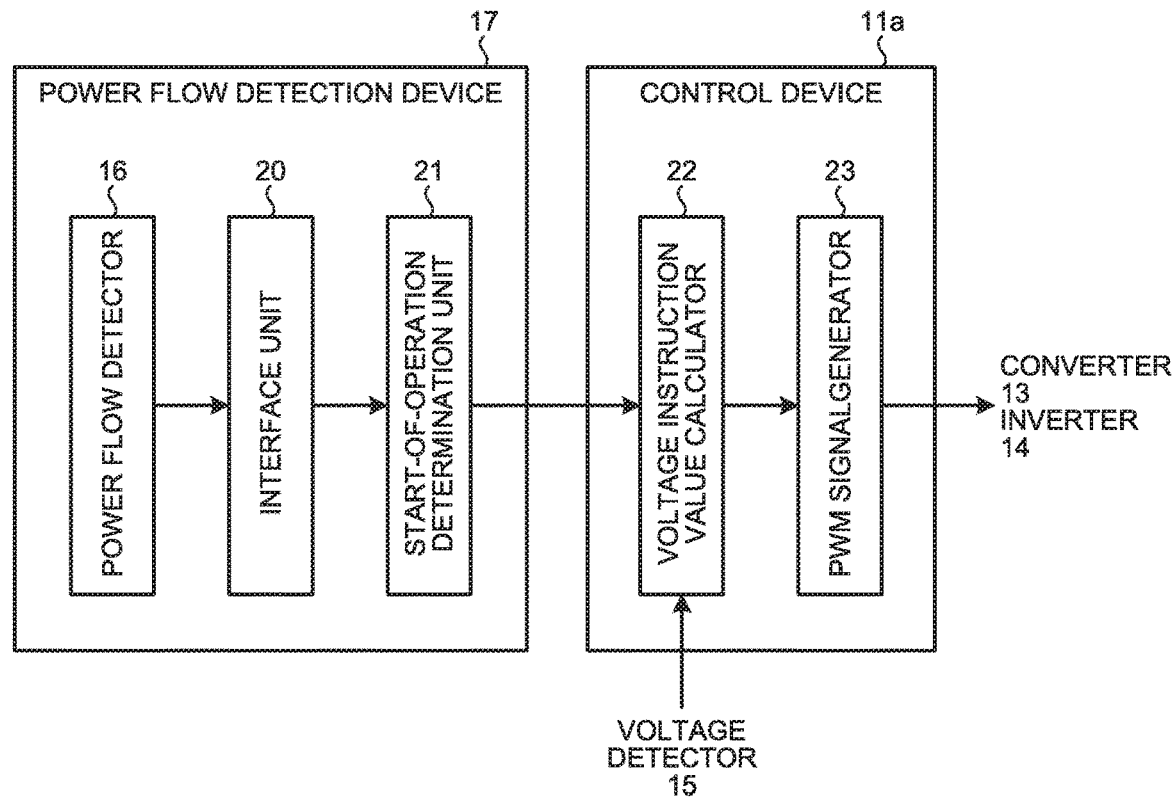
FIG. 13 is a diagram illustrating an example configuration of a power flow detection device and a control device according to the second embodiment.

The substation 100a includes a power flow detection device 17 in place of the power flow detector 16 included in the substation 100 of the first embodiment illustrated in FIG. 1. FIG. 13 is a diagram illustrating an example configuration of the power flow detection device 17 and of a control device 11a according to the second embodiment. The power flow detection device 17 includes the power flow detector 16, the interface unit 20, and the start-of-operation determination unit 21. The power flow detector 16, the interface unit 20, and the start-of-operation determination unit 21 operate similarly to those of the first embodiment. The power flow detection device 17 detects a power flow direction, which represents the direction in which the power is flowing between the AC distribution line 200 electrically connecting to an electric vehicle and a substation 100a that supplies AC power to the AC distribution line 200. In addition, the power flow detection device 17 converts the information on the power flow direction into the first signal. Moreover, the power flow detection device 17 determines whether first AC power on the AC distribution line 200 side is to be transformed into second AC power usable by the load 302 on the basis of the first signal, and if it is determined that transformation is to be performed, the power flow detection device 17 generates and outputs a second signal.

Figure 14:
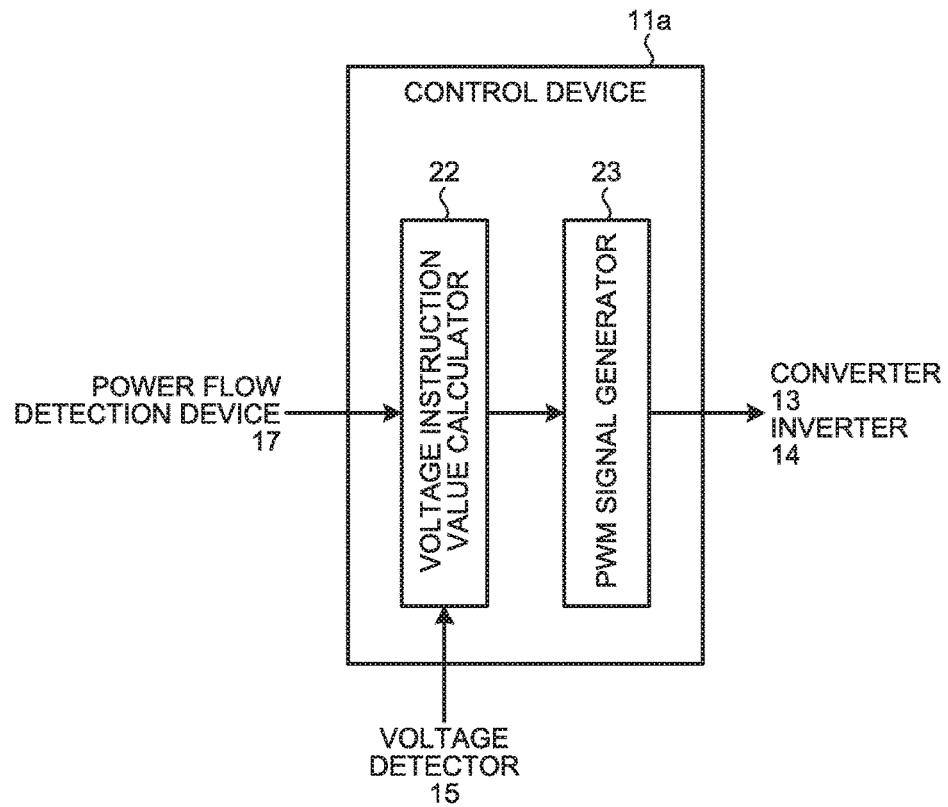
FIG. 14 is a diagram illustrating an example configuration of the control device according to the second embodiment.

Although, in FIG. 12, the power flow detection device 17 is disposed in the substation 100a, the second signal output from the power flow detection device 17 is a signal needed by the station building auxiliary power unit 1a, not by the substation 100a. Accordingly, the power flow detection device 17 may be interpreted as being included in the station building auxiliary power unit 1a despite the distant installation location thereof. FIG. 14 is a diagram illustrating an example configuration of the control device 11a according to the second embodiment. Similarly to FIGS. 2 and 3 of the first embodiment, FIG. 13 illustrates a configuration of the station building auxiliary power unit 1a including the power flow detection device 17 in the second embodiment, while FIG. 14 illustrates a configuration of the station building auxiliary power unit 1a without the power flow detection device 17 in the second embodiment.

The station building 300a includes the control device 11a in place of the control device 11 included in the station building 300 of the first embodiment illustrated in FIG. 1. As illustrated in FIGS. 13 and 14, the control device 11a includes the voltage instruction value calculator 22 and the PWM signal generator 23. The voltage instruction value calculator 22 and the PWM signal generator 23 operate similarly to those of the first embodiment.

As described above, the railroad system 50 of the first embodiment and the railroad system 50a of the second embodiment differ only in that the interface unit 20 and the start-of-operation determination unit 21 have been moved from the station building to the substation.

In the station building auxiliary power unit 1a of the second embodiment, the process to transform the 20 kV AC power on the AC distribution line 200 into the 210 V AC power, as well as the processes of the components, are performed similarly to the processes illustrated in the flowcharts of FIGS. 4 to 9 described with respect to the first embodiment. Therefore, the description of the process to transform the 20 kV AC power on the AC distribution line 200 into the 210 V AC power in the station building auxiliary power unit 1a will be omitted. Note that in the second embodiment, the process at step S2 illustrated in FIG. 4 is performed, not in the station building 300a, but in the substation 100a.

In addition, the interface unit 20 and the start-of-operation determination unit 21 in the power flow detection device 17 illustrated in FIG. 13, and the voltage instruction value calculator 22 and the PWM signal generator 23 of the control device 11a illustrated in FIGS. 13 and 14 are implemented according to the example of the hardware configuration illustrated in FIGS. 10 and 11.

As has been described above, according to the second embodiment, the interface unit 20 and the start-of-operation determination unit 21 provided in the control device 11 in the first embodiment have been moved to the power flow detection device 17 of the substation 100a. Also in this case, an advantage similar to that of the first embodiment can be provided.

As described above, the present invention can be usefully applied to a station building auxiliary power unit for converting regenerative power generated by an electric vehicle into power usable by a load in a station building.

The configurations described in the disclosed embodiments are merely examples of the present invention, and can thus be combined with other known technology, or otherwise a portion of the configurations may be omitted and/or modified without departing from the spirit of the present invention.

REFERENCE SIGNS LIST 1,1a station building auxiliary power unit; 11,11a control device; 12,101,111,301 transformer; 13 converter; 14 inverter; 15 voltage detector; 16 power flow detector; 17 power flow detection device; 20 interface unit; 21 start-of-operation determination unit; 22 voltage instruction value calculator; 23 PWM signal generator; 50,50a railroad system; 100,100a,110 substation; 200 AC distribution line; 201,202 electric vehicle; 300,300a station building; 302 load.

The invention claimed is:

1. A station building auxiliary power unit comprising:
   a start-of-operation determiner to determine, on the basis of a first signal that represents information on a power flow direction indicating a direction of flow of electrical power between an AC (alternating current) distribution line electrically connecting to an electric railway vehicle and a substation for supplying AC power to an AC distribution line, whether a first AC power on an AC distribution line side is to be transformed into a second AC power usable by a load;
   a voltage instruction value calculator to calculate a voltage instruction value that corresponds to a determination by the start-of-operation determiner; and
   a control signal generator to generate, on the basis of the voltage instruction value, a control signal for a power converter circuit to transform the first AC power into the second AC power, and to output the control signal.

2. The station building auxiliary power unit according to claim 1, wherein, if the information on the power flow direction indicates that an AC power is flowing from the AC distribution line to the substation, the start-of-operation determiner determines that the first AC power is to be transformed into the second AC power on the basis of the first signal.

3. The station building auxiliary power unit according to claim 1, wherein, if the information on the power flow direction indicates that AC power is flowing from the substation to the AC distribution line, the start-of-operation determiner determines that the first AC power is not to be transformed into the second AC power on the basis of the first signal.

4. The station building auxiliary power unit according to claim 2, wherein, if the information on the power flow direction indicates that the AC power is flowing from the substation to the AC distribution line, the start-of-operation determiner determines that the first AC power is not to be transformed into the second AC power on the basis of the first signal, and if the first AC power is being transformed into the second AC power, stops transforming the first AC power into the second AC power.

5. The station building auxiliary power unit according to claim 1, wherein the voltage instruction value calculator calculates the voltage instruction value on the basis of a voltage value of a load side AC power.

6. The station building auxiliary power unit according to claim 1, comprising:
   a power flow direction detector to detect the power flow direction indicating the direction of flow of electrical power between the AC distribution line and the substation, and to output the information on the power flow direction.

7. A station building auxiliary power unit comprising a processing circuitry:
   to calculate a voltage instruction value that corresponds to a second signal input from a power flow direction detection device, wherein the power flow direction detection device detects a power flow direction indicating a direction of flow of electrical power between an AC distribution line electrically connecting to an electric vehicle and a substation for supplying AC power to the AC distribution line, converts information on the power flow direction into a first signal being a digital signal, determines, on the basis of the first signal, whether first AC power on an AC distribution line side is to be transformed into second AC power usable by a load, and if it is determined that transformation is to be performed, generates and outputs the second signal; and
   to generate, on the basis of the voltage instruction value, a control signal for a power converter circuit to transform the first AC power into the second AC power, and to output the control signal.

8. The station building auxiliary power unit according to claim 7, comprising the processing circuitry:
   to detect the power flow direction indicating the direction of flow of electrical power between the AC distribution line and the substation, and to output the information on the power flow direction,
   to convert the information on the power flow direction into the first signal being a digital signal, and
   to determine, on the basis of the first signal, whether the first AC power is to be transformed into the second AC power, and if it is determined that transformation is to be performed, to generate and output the second signal.

9. The station building auxiliary power unit according to claim 8, wherein, if the information on the power flow direction indicates that AC power is flowing from the AC distribution line to the substation, the processing circuitry determines that the first AC power is to be transformed into the second AC power on the basis of the first signal, and generates and outputs the second signal.

10. The station building auxiliary power unit according to claim 8, wherein, if the information on the power flow direction indicates that AC power is flowing from the substation to the AC distribution line, the processing circuitry determines that the first AC power is not to be transformed into the second AC power on the basis of the first signal, and does not generate the second signal.

11. The station building auxiliary power unit according to claim 8, wherein if the information on the power flow direction indicates that AC power is flowing from the substation to the AC distribution line, the processing circuitry determines that the first AC power is not to be transformed into the second AC power on the basis of the first signal, and if the first AC power is being transformed into the second AC power, stops generating and outputting the second signal.

12. The station building auxiliary power unit according to claim 7, wherein the processing circuitry calculates the voltage instruction value on the basis of a voltage value of the second AC power.

13. The station building auxiliary power unit according to claim 5, wherein, if the start-of-operation determiner determines that the first AC power is to be transformed into the second AC power, the voltage instruction value calculator adds a voltage value that corresponds to a voltage drop value due to consumption of power in the station building auxiliary power unit to the voltage value of the load side AC power as the voltage instruction value.

14. The station building auxiliary power unit according to claim 5, wherein, if the start-of-operation determiner determines that the first AC power is not to be transformed into the second AC power, the voltage instruction value calculator makes the voltage value of the load side AC power as the voltage instruction value.

15. The station building auxiliary power unit according to claim 12, wherein, if the second signal is input, the voltage instruction value calculator adds a voltage value that corresponds to a voltage drop value due to consumption of power in the station building auxiliary power unit to the voltage value of the load side AC power as the voltage instruction value.

16. The station building auxiliary power unit according to claim 12, wherein, if the second signal is not input, the voltage instruction value calculator adds a voltage value that corresponds to a voltage drop value due to consumption of power in the station building auxiliary power unit to the voltage value of the load side AC power as the voltage instruction value.

17. A station building auxiliary power unit comprising a processing circuitry:
  to determine, on the basis of a first signal that represents information on a power flow direction indicating a direction of flow of electrical power between an AC (alternating current) distribution line electrically connecting to an electric railway vehicle and a substation for supplying AC power to an AC distribution line, whether a first AC power on an AC distribution line side is to be transformed into a second AC power usable by a load;
  to calculate a voltage instruction value that corresponds to a determination; and
  to generate, on the basis of the voltage instruction value, a control signal for a power converter circuit to transform the first AC power into the second AC power, and to output the control signal.

* * * * *